(12) United States Patent
Schwartz et al.

(10) Patent No.: US 9,812,884 B2
(45) Date of Patent: Nov. 7, 2017

(54) MANAGEMENT OF POWER DELIVERED OVER A PORT

(71) Applicant: BLACKBERRY LIMITED, Waterloo (CA)

(72) Inventors: Eric Matthew Schwartz, Waterloo (CA); Marina Mekhail, Guelph (CA); Ahmed Abdelsamie, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 149 days.

(21) Appl. No.: 14/718,283

(22) Filed: May 21, 2015

(65) Prior Publication Data

US 2015/0340898 A1  Nov. 26, 2015

(30) Foreign Application Priority Data

May 21, 2014  (CA) ...................................... 2851983

(51) Int. Cl.
*H02J 7/00* (2006.01)
*G06F 1/26* (2006.01)
*G06F 1/32* (2006.01)

(52) U.S. Cl.
CPC ............ *H02J 7/0054* (2013.01); *G06F 1/266* (2013.01); *G06F 1/3209* (2013.01); *G06F 1/3212* (2013.01); *H02J 2007/0062* (2013.01); *H02J 2007/0067* (2013.01); *H02J 2007/0096* (2013.01); *Y02B 60/1292* (2013.01)

(58) Field of Classification Search
CPC .................................................... H02J 7/0054
USPC ........................................................ 320/103
See application file for complete search history.

(56) References Cited

U.S. PATENT DOCUMENTS

| 2002/0038432 A1 | 3/2002 | Hsu |
| 2008/0140887 A1 | 6/2008 | Gallant et al. |
| 2010/0090644 A1* | 4/2010 | Nokkonen ................ G06F 1/26 320/107 |

(Continued)

FOREIGN PATENT DOCUMENTS

EP  1598732  11/2005

OTHER PUBLICATIONS

CIPO, Examine's Report relating to application No. 2,851,983 dated Jul. 8, 2015.

(Continued)

*Primary Examiner* — Suresh Memula
(74) *Attorney, Agent, or Firm* — Rowand LLP (57) ABSTRACT

The present application describes power management devices, systems and methods. In an embodiment, a power management controller is configured to: determine that a secondary electronic device requires an amount of power that exceeds a default power threshold defined in a default power scheme; monitor internal power requirements associated with on-board functions of an electronic device and determine that internal power requirements satisfy predetermined criteria; and in response to determining that the secondary electronic device requires an amount of power that exceeds the default power threshold and that the internal power requirements satisfy the predetermined criteria, adjust a power scheme associated with the port and implemented by the power limiter to provide, to the secondary electronic device, an amount of power that exceeds the default power threshold.

19 Claims, 5 Drawing Sheets

(56) References Cited

U.S. PATENT DOCUMENTS

| | | | |
|---|---|---|---|
| 2011/0025263 A1* | 2/2011 | Gilbert | H02J 7/0044 320/108 |
| 2012/0173910 A1 | 7/2012 | Ballantyne et al. | |
| 2013/0082662 A1* | 4/2013 | Carre | H02J 7/0052 320/134 |
| 2013/0254580 A1 | 9/2013 | Yan | |
| 2013/0268789 A1* | 10/2013 | Yang | G06F 1/3278 713/323 |
| 2016/0087474 A1* | 3/2016 | Tallada | H02J 7/0054 320/103 |

OTHER PUBLICATIONS

EPO, Extended European Search Report relating to EP application No. 15168759 dated Sep. 28, 2015.
EPO, EP Office Action relating to EP application No. 15168759.7, dated Jan. 18, 2017.
EP Office Action dated Sep. 7, 2017.

* cited by examiner

MANAGEMENT OF POWER DELIVERED OVER A PORT

TECHNICAL FIELD

The present application relates to power management systems and, more particularly, to devices and power management systems that are configured to manage power delivery over a port.

BACKGROUND

Universal Serial Bus On-The-Go (USB OTG) is a specification that permits electronic devices having a USB port to act as a host to an accessory device that is connected directly or indirectly to, or otherwise in communication with the host's USB port. More particularly, according to USB OTG, a primary electronic device (referred to as an A device in the specification) may provide power to an accessory device (referred to as a B device in the specification) over a voltage bus (Vbus). The OTG specification defines a Session Request protocol which allows an accessory device (i.e. a B device) to request a primary electronic device (i.e. an A device) to turn on its Vbus to provide power to the accessory device. Power supplied by the A device may be used to charge an internal battery of the accessory or, if the accessory does not have an independent source of power such as a battery, to provide power to on-board circuitry and components of the secondary device or to allow higher-demand power modules (e.g. such as class D amplifiers in an audio accessory) in the accessory to operate.

OTG specifies certain power restrictions for electronic devices. More particularly, according to the OTG specification, an accessory electronic device can only consume a certain amount of power. For example, according to the OTG specification, a primary device must be able to supply a minimum of 8 mA on Vbus at 5.25V.

When an accessory device wishes to consume an amount of power that that exceeds the amount provided for in the OTG specification, primary electronic devices supplying power often disable the USB port to prevent any power from being consumed. That is, if the accessory device wishes to consume an amount of power that exceeds the OTG-specified threshold, the primary electronic device may simply disable the Vbus so that the accessory device receives no power from the primary electronic device. Consequently, the accessory device may be unable to function.

Thus, the power scheme provided by USB OTG may provide a poor user experience when a user wishes to use an accessory with a power requirement that exceeds the thresholds provided in the USB OTG specification.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In an aspect, the present application describes an electronic device. The electronic device includes a power source and a port for connecting the electronic device to a secondary electronic device to provide power from the power source to the secondary electronic device. The electronic device also includes a power limiter coupled to the power source and the port for adjusting power provided to the secondary electronic device over the port. The electronic device also includes a power management controller coupled to the power limiter. The power management controller is configured to: determine that the secondary electronic device requires an amount of power that exceeds a default-power threshold defined in a default power scheme; monitor internal power requirements associated with on-board functions of the electronic device and determine that internal power requirements satisfy predetermined criteria; and in response to determining that the secondary electronic device requires an amount of power that exceeds the default-power threshold and that the internal power requirements satisfy the predetermined criteria, adjust a power scheme associated with the port and implemented by the power limiter to provide, to the secondary electronic device, an amount of power that exceeds the default-power threshold.

In another aspect, a method performed by a primary electronic device for managing power provided to a secondary electronic device over a port is described. The method includes: determining that the secondary electronic device requires an amount of power that exceeds a default power threshold defined in a default power scheme; monitoring internal power requirements associated with on-board functions of the primary electronic device and determining that internal power requirements satisfy predetermined criteria; and in response to determining that the secondary electronic device requires an amount of power that exceeds the default power threshold and that the internal power requirements satisfy the predetermined criteria, adjusting a power scheme associated with the port and implemented by the power limiter to provide, to the secondary electronic device, an amount of power that exceeds the default power threshold.

In another aspect, an accessory electronic device is described. The accessory electronic device includes a port for connecting the accessory electronic device to a primary electronic device. The accessory electronic device also includes a power negotiation controller coupled to the port. The power negotiation controller is configured to: monitor an operating status associated with the accessory device; and transmit data describing the operating status to the primary electronic device over the port.

In yet another aspect, an electronic device is described. The electronic device includes a port for connecting the electronic device to a secondary electronic device. The secondary electronic device is configured to provide battery charge level information to the electronic device over the port. The electronic device also includes a power source and a power limiter coupled to the power source and the port for adjusting the amount of power provided to the secondary electronic device over the port. A power management controller is coupled to the power limiter and is configured to:

receive battery charge level information from the secondary electronic device; select a power scheme associated with the port based on the battery charge level information; and implement the selected power scheme by adjusting the power limiter.

Other aspects will be described hereinafter according to the description and figures.

Example Electronic Devices

Figure 1:
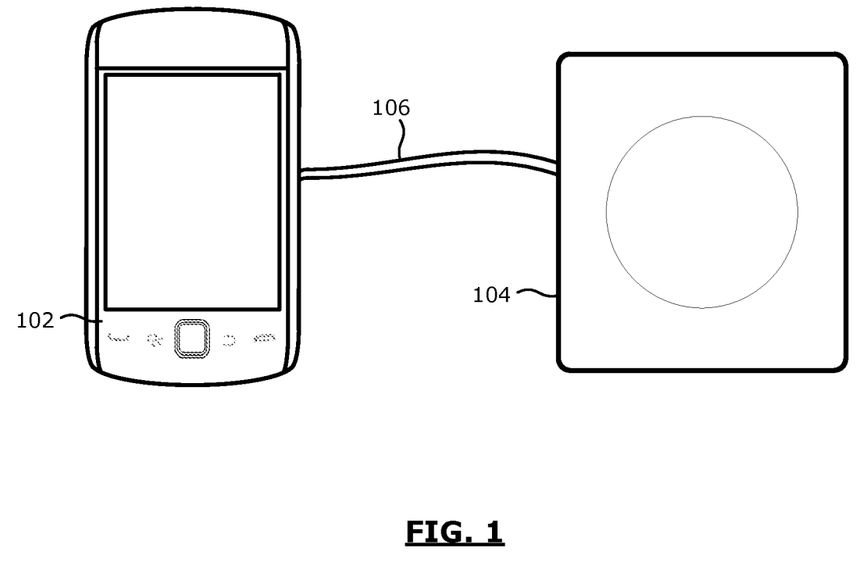
FIG. 1 is an example primary electronic device connected to a secondary electronic device using a cable.

Referring first to FIG. 1, an example primary electronic device 102 and an example secondary electronic device 104 are illustrated. The primary electronic device 102 and the secondary electronic device 104 are connected to one another via a cable 106 which is plugged into ports on the primary electronic device 102 and the secondary electronic device 104. The cable 106 plugs into a universal serial bus (USB) port on each of the electronic devices and may be referred to as a USB cable.

The primary electronic device 102 is, in the example illustrated, a mobile communication device. More particularly, the example primary electronic device 102 is a smartphone. The primary electronic device 102 may take other forms. For example, the primary electronic device may be a tablet computer, a desktop or laptop computer, a digital camera, a digital audio player, a printer, or an electronic device of another type.

The secondary electronic device 104 may also take any one of a number of possible forms. In the example illustrated, the secondary electronic device 104 is a speaker. However, in other embodiments, the secondary electronic device 104 may be a heater (such as a glove that includes a heater for heating a user's hands), a fan, a USB flash drive, a printer, a smartphone, a tablet computer, a digital camera, a keyboard, a mouse, or a USB device of another type.

As used herein, the notation "primary electronic device" and "secondary electronic device" is used to refer to the power supply role that is assumed by an electronic device. That is, when the electronic devices are connected to one another using the USB cable 106, one of the devices assumes the role of the primary electronic device and the other assumes the role of the secondary electronic device. The primary electronic device acts as a power supplier while the secondary electronic device acts as a power consumer. That is, the primary electronic device may supply power to the secondary electronic device using a power line associated with the USB ports and USB cable. This power line may be referred to as a Vbus.

In at least some embodiments, the primary electronic device and the secondary electronic device may operate, at least in part, according to a USB On-The-Go specification. According to the USB OTG specification, the device that acts as a power supplier (i.e. the "primary electronic device") may be referred to as an A-device, while the device that acts as a power consumer (i.e. the "secondary electronic device") may be referred to as a B-device.

The role of a primary electronic device 102 may also differ from the role of a secondary electronic device 104 in that the primary electronic device (i.e. the A-device) may be initially configured to act as a host and the secondary electronic device (i.e. the B-device) may be configured to act as a peripheral. That is, a master/slave relationship may exist with the primary electronic device assuming the master role and the secondary electronic device assuming the slave role. The host/master is responsible for data transfer over a data bus associated with the USB connection over the ports and cable 106.

Since the secondary electronic device 104 assumes the role of the slave/peripheral, it may be referred to as an accessory electronic device.

USB On-The-Go permits electronic devices to swap hosting roles. That is, a device can either act as a host or as a peripheral. By way of example, in the configuration of FIG. 1 the smartphone acts as the primary electronic device and assumes the hosting duties and the speaker acts as a peripheral. However, if the smartphone were instead connected to a computer, the smartphone may assume the role of the peripheral and may act as a flash drive, allowing the computer to read data from the smartphone. In at least some embodiments, the roles of the computer/smartphone may be assigned based on the configuration of the cable 106. That is, the cable 106 may have an A-end and a B-end and the device that is connected to the A-end will become the primary electronic device (i.e. the A-device) while the device that is connected to the B-end will become the secondary electronic device (i.e. the B-device). The electronic devices may be configured to monitor an ID pin associated with the cable 106 to determine which whether an A-end of the cable is connected to the electronic device or a B-end of the cable is connected to the electronic device.

According to the USB OTG specification, a power consumer device is only permitted to consume a threshold amount of power (which may be referred to as a default power threshold). For example, typically OTG devices limit the drain current to 500 mA at 5V. In at least some embodiments, the primary electronic device 102 and the secondary electronic device 104 may depart from the OTG specification in that these devices are equipped with the power management functions described herein. For example, the primary electronic device may, in some embodiments supply an amount of power to the secondary electronic device that exceeds the default power threshold defined in the OTG specification. As will be described in greater detail below, in some embodiments, the primary electronic device 102 may allow an amount of power that exceeds the default power threshold to be consumed if the primary electronic device is operating in a mode in which its own on-device functions require an amount of power that is less than a threshold. That is, if the primary electronic device is operating in a low power state where little power is used to function (e.g. a hibernation or sleep mode), the primary electronic device may make a decision or determination to provide an increased amount of power to the secondary electronic device 104.

In some embodiments, the secondary electronic device 104 may be capable of providing data about its power requirements and/or operating status to the primary electronic device 102 to allow the primary electronic device 102 to better determine an amount of power that should be supplied to the secondary electronic device. For example, the secondary electronic device 104 may inform the primary electronic device 102 of the amount of charge left in a battery associated with the secondary electronic device 104. The primary electronic device may then adjust a power scheme based on the amount of charge remaining in the battery of the secondary electronic device. For example, if the battery level of the secondary electronic device exceeds a default power threshold, then the primary electronic device may not supply power and may instead let the secondary electronic device rely on its own internal power supply.

In some embodiments, the secondary electronic device 104 may inform the primary electronic device 102 about operating conditions of the secondary electronic device 104 determined from sensor data obtained from a sensor of the secondary electronic device 104. By way of example, if the secondary electronic device includes a heater, the secondary electronic device may also include a temperature sensor. In such embodiments, the secondary electronic device may provide temperature information to the primary electronic device and the primary electronic device may use the temperature information when selecting a power scheme to use for providing power to the secondary electronic device. For example, if the temperature is sufficiently high, the power supplied to the secondary electronic device may be reduced by the primary electronic device or switched off entirely.

Figure 2:
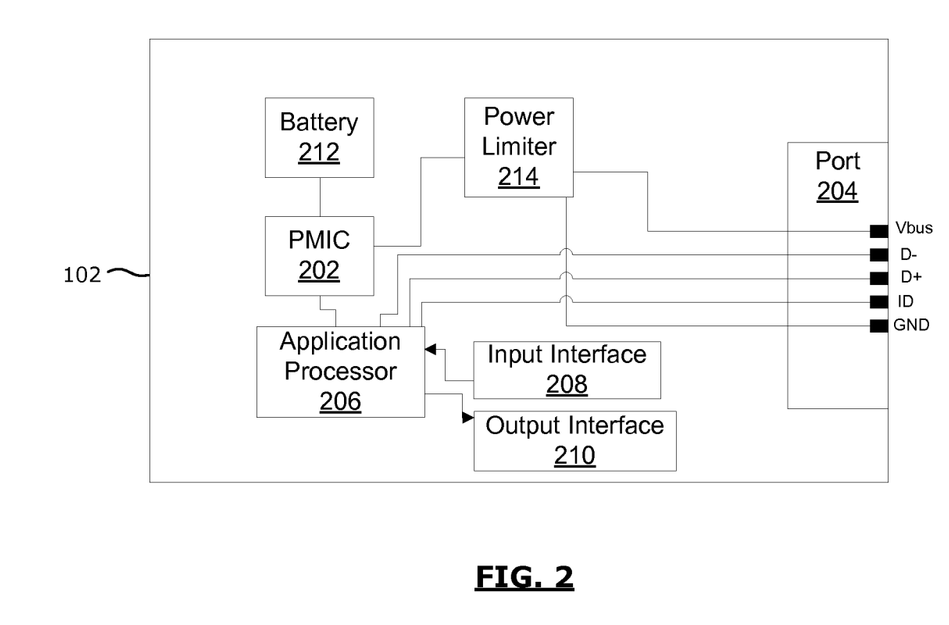
FIG. 2 is a block diagram of an example primary electronic device.

Thus, power management functions are described herein which allow the primary electronic device to selectively increase or decrease the amount of power supplied to the secondary electronic device. Reference will now be made to FIG. 2, which illustrates a block diagram of an example primary electronic device 102.

As noted above, the primary electronic device 102 may be connected to a secondary electronic device 104 using a cable 106 (FIG. 1). The cable 106 may be attached to the primary electronic device 102 via a port 204. The port 204 is a USB port and may, for example, be a micro USB port, a mini USB port or a standard type A USB port. In at least some embodiments, the port may be a Micro-A format port. In some embodiments, the port may be a Micro-AB port. A Micro-AB port is a port that can accept both a Micro-A plug and a Micro-B plug.

The port includes a plurality of pins constituted by two power pins (Vbus—a power line, and GND—a ground connection), two differential data pins (D+, D−) for carrying differential data signals, and an identification pin (ID).

The differential data pins (D+, D−) are used for sending data between the electronic devices. By way of example, in the embodiment illustrated in FIG. 1 the secondary electronic device is a speaker and audio data may be provided over the differential data pins. A controller may be connected to the differential data pins and may handle communications over the port. The controller may send and receive data using the differential data pins of the port 204. In the embodiment illustrated, the controller is an application processor 206 of the electronic device. The application processor is the main processor of the primary electronic device and may be a system on chip (SoC) that is designed to support applications running in a mobile operating system environment provided by the primary electronic device. It will be appreciated that the controller which is connected to the differential data pins may take other forms in other embodiments and may, for example, be provided by a processor or controller which is not an application processor.

In at least some embodiments, the application processor is connected to the ID pin of the port and is configured to receive data over the ID pin. Techniques for communicating over the ID pin are described below.

The controller may be associated with memory (not shown) containing instructions which, when executed, configure the controller to perform one or more of the functions described herein. For example, processor-executable instructions may configure the processor (e.g. the application processor 206) to perform one or more of the power management functions described herein.

Memory associated with the controller may store other data in addition to the processor-executable instructions. For example, in some embodiments, one or more power requirement profiles may be stored in memory. A power requirement profile may specify power requirements of a specific type or class of device. A power requirement profile may define current and/or voltage requirements of a secondary electronic device. By way of example, voltage and current requirements may be specified for a device. These voltage or current requirements may indicate a desired voltage or current for the associated device.

In some embodiments, a secondary electronic device 104 is configured to send device type information to the primary electronic device 102. This device type information identifies the type or class of the secondary electronic device and the primary electronic device uses this device type information, when received, to look up or otherwise determine an associated power requirement profile in the memory. An appropriate power scheme for the port may then be implemented by the primary electronic device based on the power requirements specified in the retrieved power requirement profile.

In at least some embodiments, the type or class associated with a power requirement profile may be a generic type or class that does not depend on model number or brand of the secondary electronic device 104. For example, in some embodiments, a single power requirement profile may be specified for all flash drives. For example, a flash drive manufactured by a first manufacturer and a flash drive manufactured by a second manufacturer may both send the same device type information when connected to the primary electronic device. That is, a common device type identifier may be assigned to both devices. The use of generic device type or device class identifiers reduces memory usage required for storing power requirement profiles from the memory usage that would be used in embodiments where devices are identified at a more detailed level (e.g. by model number or manufacturer).

The memory associated with the controller may be of various types and the controller may be associated with more than one memory element in some embodiments. The memory associated with the controller may, for example, include non-volatile random access memory (such as flash memory), random access memory (RAM) and/or read only memory (ROM). Indeed, different types of memory may be employed.

The controller (e.g. the application processor 206) may be coupled with one or more input interfaces 208. An input interface is a mechanism that enables input of instructions (e.g. by a user of the primary electronic device 102) to the controller of the primary electronic device. The input interfaces 208 may include a touchscreen display, a button, a switch, a keyboard, a camera, a microphone, a navigational input device such as a trackball or trackpad, or an input interface of another type. As will be described in greater detail below, the input interface 208 may be used for receiving user input that may assist in selecting a power scheme to be used with the port 204.

The controller may also be coupled with one or more output interfaces 210. The output interfaces may provide an audible, visual and/or vibratory output. For example, the output interfaces may include a display such as a liquid crystal display (LCD), a speaker or a vibrator motor. The output interfaces may be used for outputting information, such as warnings, and for providing a graphical user interface (GUI) which may facilitate the entry of information via the input interface 208.

The primary electronic device 102 also includes a battery 212. The battery 212 is used to provide power to on-board electrical and electronic components and to the secondary electronic device 104 via the power pins (Vbus and GND) of the port 204.

In the example shown in FIG. 2, the battery 212 is connected to a power management controller. In the embodiment of FIG. 2, the power management controller is a power management integrated circuit (PMIC) 202. The power management controller, PMIC 202, is configured to manage power requirements of the primary electronic device 102 including the power that is supplied to the secondary electronic device via the port 204. The power management controller, PMIC 202, may include a plurality of functions and features including one or more of: direct current to direct current conversion to allow for dynamic voltage scaling, battery charging, power-source selection (e.g. in the case that the primary electronic device 102 is connected to an external power supply), voltage scaling, power sequencing, etc.

In at least some embodiments, the power management controller may be programmable. For example, the power management controller may include memory and a processor that executes processor executable instructions. The processor-executable instructions may, for example, configure the processor to manage power supplied to a secondary electronic device 104 over the port 204. Example techniques for managing power supplied to the secondary electronic device over the port that may be implemented by the power management controller 202 are described below with reference to FIGS. 4 and 5.

The power management controller 202 controls the amount of power that is available to the secondary electronic device via the port 204. That is, the power management controller 202 controls the amount of power that is available over the Vbus power pin of the port 204. More particularly, the power management controller is coupled with a power limiter 214, which is controlled by the power management controller 202. The power limiter limits the amount of power that is supplied to the secondary electronic device over the port 204. The power limiter 214 is a current limiter in at least some embodiments. A current limiter controls the amount of current that is provided over the port 204. To do so, the current limiter may include a variable resistor which is controlled by the power management controller 202. The resistance of this variable resistor may be modified to limit the current through the Vbus power pin.

While the power limiter 214 and the power management controller 202 are illustrated as separate components in FIG. 2, in some embodiments, they may be implemented on a common chip or module. For example, the power limiter 214 and the power management controller 202 may be included in a common PMIC.

Furthermore, as noted above, in at least some embodiments, both the application processor 206 and the power management controller 202 may include processors which are configured to execute processor-executable instructions stored in associated memory. In such embodiments, the application processor 206 may perform or may assist or cooperate in performing some of the functions of the power management controller 202 that are described herein. In such embodiments, the term "power management controller" may be used to include both the PMIC and the application processor since these components collectively provide the functions described herein as being performed by the power management controller.

Further, while the embodiment above describes two processors or controllers (i.e., a power management controller 202 which includes a processor and a separate application processor 206), in some embodiments, a different number of processors may be used. For example, in some embodiments, the primary electronic device 102 may include a single processor. In some embodiments, a greater number of processors may be included in the primary electronic device (e.g., 3 or more).

Figure 3:
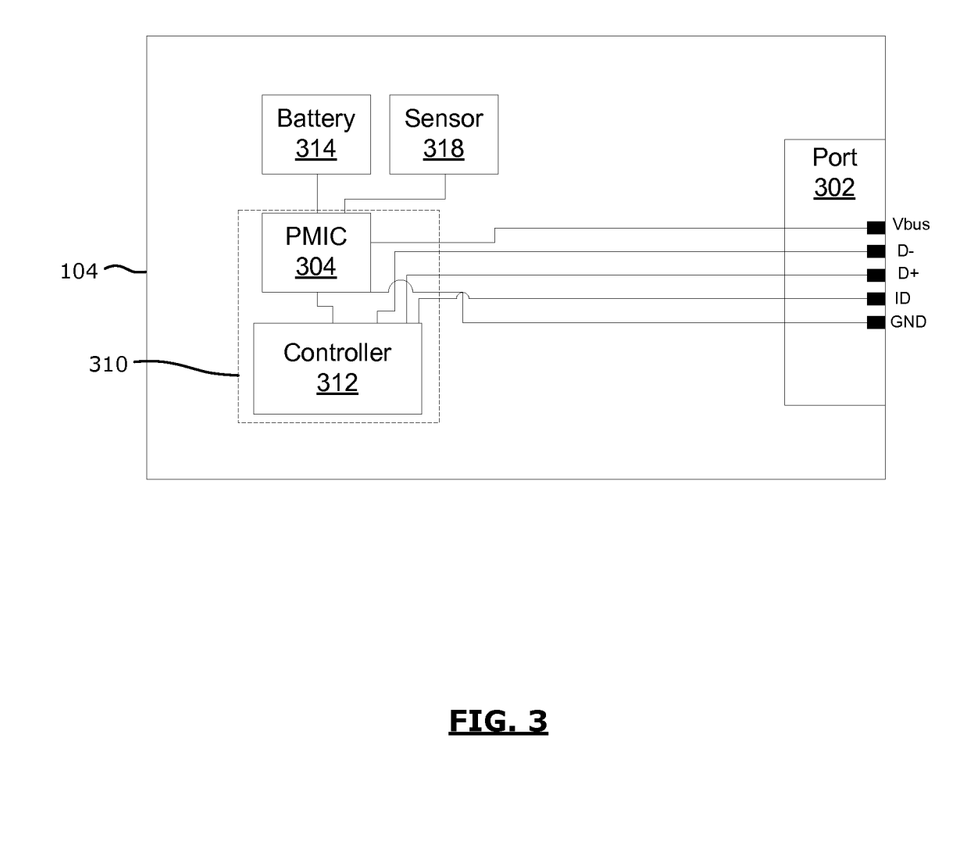
FIG. 3 is a block diagram of an example secondary electronic device.

Referring now to FIG. 3, an example secondary electronic device 104 will now be described. The secondary electronic device 104 may also be referred to as an accessory electronic device. As noted above, the secondary electronic device 104 may take various forms and the specific configuration of the secondary electronic device 104 will depend on the type of the device.

The secondary electronic device 104 includes a port 302 for connecting the accessory electronic device to the primary electronic device 102. That is, the port connects to one end of a cable 106 (FIG. 1), which is connected to the port 204 of the primary electronic device 102 at its other end. The port 302 includes a number of pins which correspond to the pins of the port 204 of the primary electronic device. For example, the port includes two power pins (Vbus and GND), two differential data pins (D+, D−) for carrying differential data signals, and an identification (ID) pin.

Like the port 204 of the primary electronic device, the port 302 of the secondary electronic device is a USB port and may, for example, be a micro USB port, a mini USB port or a standard type B USB port. In at least some embodiments, the port may be a Micro-B format port. In some embodiments, the port may be a Micro-AB port.

USB OTG uses the orientation of the cable 106 (FIG. 1) to allow the electronic devices to determine which electronic device will act as a primary electronic device (i.e. assume the device-A role, which include hosting and supplying power) and which electronic device will act as a secondary electronic device (i.e. assume the device-B role, which is that of a slave/peripheral and power consumer). Accordingly, in some embodiments, the port 204 of the primary electronic device is an "A" port, which is capable of receiving an "A" end of a cable 106 but not a "B" end of the cable 106 and the secondary electronic device is a "B" port which is capable of receiving the "B" end of the cable but not the "A" end of the cable." In other embodiments, one or both of the ports may be "AB" ports, which are capable of receiving both the A end and the B end of the cable.

As noted above in the discussion of the primary electronic device, the secondary electronic device may receive power from the primary electronic device over the port 204. In such cases, the Vbus pin of the port acts as a power line when the power is received from the primary electronic device over the Vbus.

The secondary electronic device 104 includes circuitry for conditioning the received power into a form suitable for use by components of the secondary electronic device. For example, a voltage regulator may be included to ensure that a constant voltage is maintained.

In at least some embodiments, such power conditioning functions may be provided by a power management integrated circuit (PMIC) 304. The PMIC 304 is configured to manage power requirements of the secondary electronic device 104. The PMIC 304 may include a plurality of functions and features including one or more of: direct current to direct current conversion to allow for dynamic voltage scaling, battery charging, power-source selection (e.g. in the case that the secondary electronic device 104 is connected to an external power supply including, for example, the primary electronic device via the port 302), voltage scaling, power sequencing, etc.

In some embodiments, the secondary electronic device 104 may be configured to transmit data to the primary electronic device 102 to allow the primary electronic device to make informed decisions when selecting a power scheme to be used with its port 204. For example, the power management controller 202 of the primary electronic device may use such information to determine the amount of power that it will supply to the secondary electronic device.

In some embodiments, a power negotiation controller 310 may be included in the secondary electronic device which functions to send the data about the secondary electronic device to the primary electronic device. The power negotiation controller 310, in the example illustrated, includes the PMIC 304 and a controller 312, which is a microcontroller in the example. The PMIC 304 functions to monitor an operating status associated with the secondary electronic device, and the controller 312 functions to transmit data describing the operating status, or other data describing the secondary electronic device 104, to the primary electronic device 102 over the port 302.

In some embodiments, the controller 312 may be connected to the port and may send data to the port over the differential data pins (D+, D−). In other embodiments, data may be sent over the ID pin. Techniques for sending data over the ID pin are described in greater detail below.

The operating status information that may be sent to the primary electronic device 102 may include battery charge level information. For example, the secondary electronic device may include a battery 314, which is coupled with the PMIC 304 in the example illustrated. The battery 314 may be a rechargeable battery which is used to power on-board functions of the secondary electronic device 104. The power negotiation controller 310 (e.g. the PMIC 304) may determine a battery charge level associated with the battery 314 and may then transmit battery charge level information describing the battery charge level to the primary electronic device 102. The battery charge level may, for example, be specified in terms of a percentage of total power remaining in the battery, an amount of time remaining until the battery is depleted, or using another metric representing the amount of battery power remaining.

As will be described in greater detail below, such battery charge level information may be used to allow the primary electronic device 102 to select a power scheme to be used with its port 204. For example, if a lot of battery power remains (e.g. if the amount of power in the battery 314 is determined to exceed a battery charge threshold), then the primary electronic device may limit the amount of power provided to the secondary electronic device. However, if a little battery power remains (e.g. if the amount of power in the battery 314 is determined to be below a battery charge threshold), then the primary electronic device may decide to provide additional power.

In some embodiments, the secondary electronic device 104 may include a sensor 318 coupled with the power negotiation controller. The sensor 318 generates sensor data regarding the operating status of the secondary electronic device 104. The power negotiation controller 310, in some embodiments, uses the sensor data to provide sensor information to the primary electronic device 102. By way of example, in some embodiments, the sensor 318 is a temperature sensor such as a thermistor. In such cases, temperature information may be provided to the primary electronic device 102.

As will be described in greater detail below with reference to FIG. 5, the sensor information may be used by the primary electronic device 102 in order to select a power scheme to be used with the port 204. For example, in some embodiments, the secondary electronic device may include a heater. The heater may be used to dispense heat in the vicinity of the secondary electronic device and may, in some embodiments, be configured in a secondary electronic device that takes the form of a glove for heating a user's hand. In such embodiments, feeding back temperature information to the primary electronic device allows the primary electronic device to select a power scheme based on the temperature associated with the heater. For example, if the temperature is too hot (e.g. greater than a threshold temperature level), then the amount of power supplied to the gloves may be reduced but if the temperature is too cold (e.g. less than a threshold temperature level), then the amount of power supplied to the gloves may be increased.

In some embodiments, the power negotiation controller 310 is configured to send power requirement data to the primary electronic device 102 indicating the amount of power that is requested, required or preferred by the secondary electronic device 104. This information may be determined by the secondary electronic device by monitoring current operating conditions. For example, the power negotiation controller may monitor the voltage at the power pin (Vbus) of the port and may send the voltage level to the primary electronic device. This information may then be used by the primary electronic device 102 to select a power scheme to be used with the port. While the primary electronic device 102 is able to monitor the voltage at its own Vbus without assistance from the secondary electronic device 104, this voltage does not account for losses associated with the cable 106. By sending voltage level information from the secondary electronic device to the primary electronic device, the primary electronic device is able to use this information to select a power scheme to use with the port 204. For example, if the primary electronic device 102 determines that the power received by the secondary electronic device 104 at its port 302 is less than a threshold, then it may increase the power supplied.

In some embodiments, the power negotiation controller 310 may have associated memory which may be used for storing data about the secondary electronic device including power requirement data. For example, in some embodiments, the memory may store power requirement data indicating average and/or peak power requirements or preferences for the secondary electronic device. The power negotiation controller 310 may retrieve such data from the memory and may send the power requirement data to the primary electronic device. The primary electronic device may use such information when selecting a power scheme for use with its port 204.

In some embodiments, the memory associated with the power negotiation controller 310 may store device type information which identifies the type of the secondary electronic device 104. For example, the device type information may specify whether the secondary electronic device is a smartphone, printer, mouse, keyboard, speaker, heater, light, or an accessory of another type. In some embodiments, the power negotiation controller 310 may send the device type information to the primary electronic device via the port. The primary electronic device may use the device type information when selecting a power scheme for use with the port 204. For example, a different power scheme may be applied if the device type information indicates that the device is of a first type (e.g. a smartphone) than would be applied if the device type information indicates that the device is of a second type (e.g. a heater).

In some embodiments, the device type information may specify a generic type or class of the device that does not include a model number or brand (e.g. manufacturer identifier) of the electronic device. In other embodiments, the device type information may specify a model number or brand of the electronic device.

The power negotiation controller 310 may be associated with memory (not shown) containing instructions which, when executed, configure the negotiation controller to perform one or more of the functions described herein. For example, processor-executable instructions may configure one or both of the controller 312 and the PMIC 304 to monitor for or retrieve any of the information described above and send such information to the primary electronic device 102 via the port 302.

The secondary electronic device 104 includes a number of additional components, the nature of which will depend on the type of the device. By way of example, in some embodiments (such as in the embodiment of FIG. 1), the secondary electronic device 104 may be an auxiliary speaker and may include one or more speakers which may generate audible signals based on data received over the data pins (D+, D−) associated with the port.

Managing Power Output of a Port of a Primary Electronic Device

Figure 4:
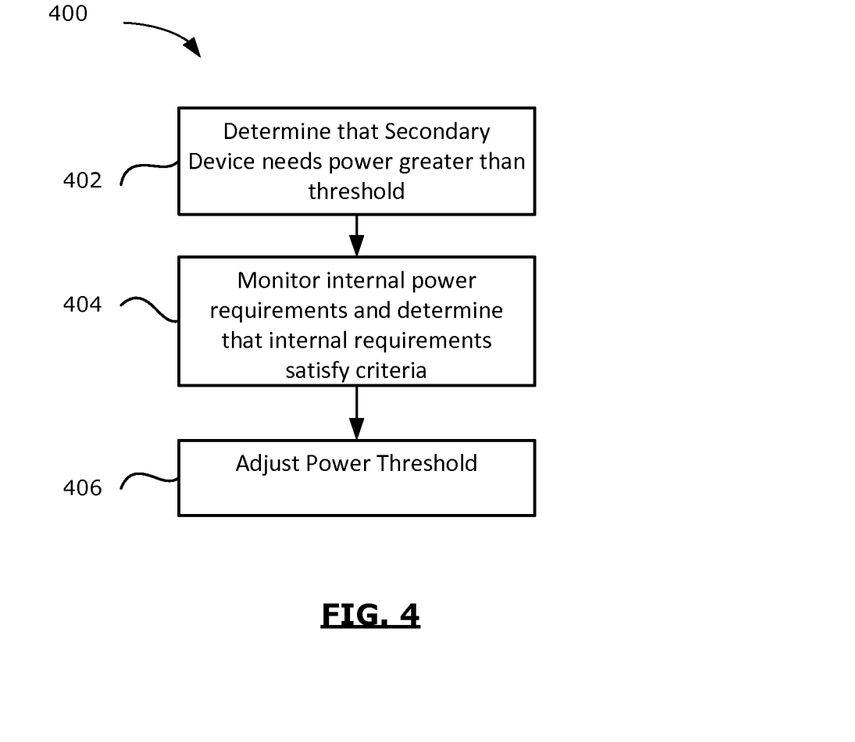
FIG. 4 is a flowchart of an example method for managing power output of a port of a primary electronic device.

Referring now to FIG. 4, a method 400 of adjusting a power scheme associated with a port will now be described. The method 400 may be implemented by an electronic device, which may be a primary electronic device 102 of the type described previously. More particularly, a power management controller 202 associated with the primary electronic device 102 may be configured to perform the method 400. In some such embodiments, the power management controller may include or be associated with a processor. The processor may have an associated memory containing processor-executable instructions which, when executed, cause the processor to perform the method 400.

The method 400 of FIG. 4 may allow the primary electronic device 102 to adjust the power supplied to a secondary electronic device 104 through a port 204 based on the needs of the primary device. That is, the primary electronic device 102 may ensure that on-board functions have sufficient power and may allow the secondary electronic device 104 to access a greater amount of power if the internal requirements of the primary electronic device are low at a given time.

At block 402, the power management controller 202 monitors power requirements of a secondary electronic device connected to the primary electronic device (e.g. with a cable 106 as shown in FIG. 1) and may determine that the secondary electronic device is requesting or requires an amount of power that exceeds a default power threshold defined in a default power scheme. The default power scheme may be defined in the USB On-The-Go (OTG) specification in some embodiments and the power management controller 202 may, at block 402, determine that the secondary electronic device is requesting or requires a current that exceeds a predefined maximum current associated with the OTG specification.

The monitoring of the power requirements of the secondary electronic device (at block 402) may, for example, be performed by determining whether the current drawn through the port 204 is at a present maximum allowable current. More particularly, while the operation of block 402 is being performed, the power scheme associated with the port may be set to the default power scheme (which may be the default defined in the OTG specification). The default power scheme may have a current limit that is imposed on the port by the power limiter. When the power management controller 202 detects that the maximum current is being drawn (i.e. that current is being drawn at a level associated with the current limit), it may determine that the secondary electronic device requires an amount of power that exceeds a default power threshold defined in the default power scheme.

In other embodiments, data received from the secondary electronic device 104 may be used to determine that the secondary electronic device 104 is requesting or requires an amount of power that exceeds the default power threshold defined in the default power scheme. For example, as noted in the discussion of the secondary electronic device above, power requirement data may be provided from the secondary electronic device to the primary electronic device 102. This data indicates an amount of power required by the secondary electronic device, and the primary electronic device may use this data to determine whether the secondary electronic device requires an amount of power that exceeds the default power threshold defined in the default power scheme.

In some embodiments, the data received from the secondary electronic device 104 may include device type information and the secondary electronic device may use this device type information to retrieve, from memory, a power requirement profile for the type of device that is indicated by the device type information. The power requirement profile indicates standard power requirements for devices of the given category and it may be used to determine whether the secondary electronic device requires an amount of power that exceeds the default power threshold defined in the default power scheme.

In at least some embodiments, the device type information is sent from the secondary electronic device 104 to the primary electronic device over the ID pin of the port.

At block 404, the power management controller 202 monitors internal power requirements associated with on-board functions of the primary electronic device. That is, the power management controller 202 determines the amount of power that is being used by the primary device for its own internal operations. The power management controller 202 then determines whether the amount of power that is being used for internal operations satisfies predetermined criteria. For example, in some embodiments, the power management controller 202 determines whether the amount of power is less than a predetermined threshold.

At block 404, the power management controller 202 determines whether the primary electronic device can spare more power to provide to the secondary electronic device. If the power management controller 202 determines that more power may be provided to the secondary electronic device (e.g. if the amount of power that is being used for internal operations satisfies the predetermined criteria), then at block 406 the power scheme associated with the port and implemented by the power limiter may be adjusted. More particularly, in response to determining that the secondary electronic device requires an amount of power that exceeds the threshold and that the internal power requirements of the primary electronic device satisfy the predetermined criteria, then the power scheme associated with the port 204 may be adjusted so that the secondary electronic device is provided with an amount of power that exceeds the threshold. For example, the current limit associated with the port may be adjusted at block 406.

Other criteria may be used to adjust the power scheme instead of or in addition to the criteria described with reference to the method 400 of FIG. 4. For example, referring now to FIG. 5, a further example method 500 is illustrated for adjusting a power scheme associated with a port 204. The method 500 may be implemented by an electronic device, which may be a primary electronic device 102 of the type described above. More particularly, a power management controller 202 associated with the primary electronic device 102 may be configured to perform the method 500. In some such embodiments, the power management controller 202 may include or be associated with a processor. The processor may have an associated memory containing processor-executable instructions which, when executed, configured the processor to perform the method 500.

Figure 5:
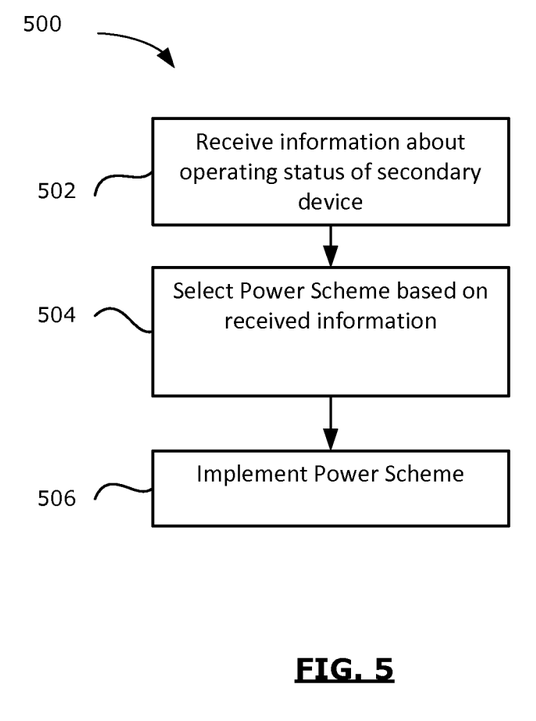
FIG. 5 is a flowchart of another example method for managing power output of a port of a primary electronic device.

The method 500 of FIG. 5 may allow the primary electronic device to adjust the power supplied to a secondary electronic device through a port 204 based on information received from the secondary electronic device about an operating status of the secondary device.

At block 502, operating status information is received at the primary electronic device from the secondary electronic device. The operating status information defines a present operating condition. That is, the operating status information is real-time or near real-time information about the status of the secondary electronic device.

As noted in the discussion of the secondary electronic device above, the operating status information may include battery charge level information which quantifies the amount of battery power remaining for a battery of the secondary electronic device.

As also noted above, the operating status information may include sensor information that is obtained from sensor data generated by a sensor on the secondary electronic device. For example, the secondary electronic device may include a temperature sensor and may send temperature information to the primary electronic device, which may be received at block 502.

The operating status information may, in some embodiments, be received by the primary device 102 at the ID pin of the port 204.

At block 504, the power management controller selects a power scheme associated with the port based on the operating status information received from the secondary electronic device. For example, in some embodiments, a power scheme may be selected based on a battery charge level information received from the secondary electronic device. For example, in some embodiments, at block 504 the power management controller 202 may compare the battery charge level for the battery of the secondary electronic device 104 to a battery charge threshold. In some embodiments, this threshold may be defined based on user input (for example, a user may instruct the primary electronic device 102 to not let the battery on the secondary electronic device drop below a threshold e.g. 5%). In this sense, the threshold may also be referred to as a user-defined threshold.

In some embodiments, if the battery charge level is less than the battery charge threshold, the power scheme may be adjusted. That is, if the power management controller 202 determines that the battery charge level is less than the battery charge threshold, it may determine that the power scheme for the port should be adjusted. For example, a current limit implemented by a current limiter may be increased to allow the secondary electronic device to draw a greater amount of current. In contrast, in some embodiments, if the battery charge level is determined to be greater than the battery charge threshold, the power scheme may not be adjusted, or the power scheme may be adjusted in a different way (e.g. by reducing the current limit). Accordingly, the power provided to the secondary electronic device from the primary electronic device may be higher when the battery charge level is below the battery charge threshold than if the battery charge level were instead above the battery charge threshold.

In some embodiments, at block 504, the power management controller 202 may select a power scheme based on sensor information received from the secondary electronic device. The sensor information may, for example, indicate a level or reading associated with the sensor (e.g. a temperature level detected at a temperature sensor) and the power management controller 202 may select a power scheme by comparing the level or reading to a threshold. In some embodiments, if the level or reading is greater than the threshold (e.g. if the temperature is above a temperature threshold), then the power scheme may be adjusted to further limit the power supplied to the secondary electronic device.

In some embodiments, a power scheme may be automatically selected (at block 504) without user input. In other embodiments, the selection of the power scheme at block 504 may be based on user input received via an input interface of the primary electronic device. For example, in some embodiments, the power management controller may estimate an effect of a particular power scheme on its power source (e.g. on the primary electronic device's battery). For example, the power management controller may estimate the effect of use of a particular power scheme to provide power to the secondary electronic device connected to the port 204. For example, the power management controller 202 may determine the amount of time remaining until the primary electronic device's battery is depleted if a power scheme were to be used to provide power to the secondary electronic device. The power management controller may also determine the amount of time remaining until the primary electronic device's battery is depleted if an alternative power scheme were to be used; for example, if no power were provided to the secondary electronic device over the port.

A warning may be generated on an output interface, such as a display, based on the estimates. For example, a notification may be generated (e.g. on a display screen) which indicates the effect on the primary electronic device's battery if a particular power scheme were to be used e.g. a warning such as "If you wish to power the secondary electronic device, the battery will be depleted in 5 minutes. If you do not power the secondary electronic device, the battery is estimated to last 1 hour."

The display screen may prompt a user to input a power scheme preference e.g. "Would you like to provide power to the secondary electronic device?" Input may be received from the input interface 208. The received input indicates a power scheme preference for the user and the power scheme may be selected based on the power scheme preference. That is, a power scheme is then implemented (at block 506) by the power limiter in accordance with the power scheme preference.

At block 506, the power scheme selected at block 504 is implemented. For example, a power limiter may be adjusted to adjust a power limit for the port. For example, a current limit may be set to a higher limit in some embodiments. In some embodiments, the current limit may be set to a limit which exceeds a limit defined in the USB OTG specification.

In some embodiments, the method 500 may not end at block 506. For example, in some embodiments, power scheme preferences received at block 504 or received at another time from a user via an input interface 208 specify one or more trigger conditions. The trigger conditions specify a condition which will cause the power scheme that is implemented at block 506 to be disabled. For example, a user may specify that the power scheme should be disabled when the battery of the primary electronic device drops to a specified threshold (e.g. when there is only 10% total charge remaining), or when the charge on the battery of the secondary electronic device is increased to a specified threshold (e.g. when it is increased to 50% of its total charge), or when the operating time provided by the battery of the primary electronic device drops to a specified threshold (e.g. 20 minutes operating time remaining) In such embodiments, after block 506 the power management controller may determine whether the specified condition exists and, if so, may disable the power scheme implemented at block 506. Thresholds defined by a user may be referred to as user-defined thresholds.

For example, power source conditions (e.g. battery conditions) may be monitored after block 506 and, in some instances, the power controller may determine that a power source condition has reached the threshold (e.g. that the battery charge level of the primary electronic device's battery has dropped to the specified threshold). In response to determining that the power source has reached the threshold, the power scheme associated with the port may be adjusted to reduce the amount of power provided to the secondary electronic device.

Communication Over ID Pin

As noted previously, in some embodiments, data sent from the secondary electronic device 104 to the primary electronic device 102 may be sent over the ID pin. According to the USB OTG specification, the ID pin is not used to transmit data and is, instead, used to identify the end of the cable that is connected to an electronic device, which is used to determine the role that will be assumed by the electronic device (i.e. whether the device will take the role of the master/host or slave/peripheral). More particularly, at the A end of the cable (which is the end that is meant to be connected to the host/master), the ID pin is grounded (i.e. is connected to the ground pin) and at the B end of the cable (which is the end that is meant to be connected to the peripheral/slave), the ID pin is floating. The primary electronic device receiving the A end of the cable is able to determine that it is assuming the role of the host by determining that the ID pin of its port is connected to ground.

To transmit data over the ID pin, the cable is modified so that the ID pin at one end of the cable is connected to the ID pin at the other end of the cable using a transport mechanism, such as a wire. In this modified cable, the ID pin is not connected to the ground pin at either end. Thus, the ID pin is used to create a new transmission path that may be used to transmit data between two electronic devices.

In such embodiments, the secondary electronic device may be configured to only assume the role of the slave/peripheral. The secondary electronic device may, however, inform the primary electronic device that the primary electronic device is to act as host by briefly connecting the ID pin to ground. For example, a switch may be activated to connect the ID pin to the ground pin. After a predetermined period of time has elapsed, the ID pin is disconnected from ground and is instead used for data transmission.

The primary electronic device 102 is configured to use the ID pin to first determine its role. More particularly, the primary electronic device 102 recognizes that the ID pin is connected to ground (since the secondary electronic device 104 made this connection) and, after a predetermined period of time has elapsed, it begins monitoring for data transmission over the ID pin. If no data is received over the ID pin, then the primary electronic device determines that the secondary electronic device is not configured to use the ID pin for data transmission (e.g. that it operates according to the current OTG specification). Thus, the primary electronic device 102 is backwards compatible in that it is capable of interacting both with devices that utilize the ID pin for data transmission and devices that use the ID pin in the manner defined in the OTG specification.

In some embodiments a computer readable medium may include instructions for performing one or more of the methods described herein. The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
   a power source;
   a port for connecting the electronic device to a secondary electronic device to provide power from the power source to the secondary electronic device;
   a power limiter coupled to the power source and the port for adjusting power provided to the secondary electronic device over the port; and
   a power management controller coupled to the power limiter and configured to:
      determine that the secondary electronic device requires an amount of power that exceeds a default power threshold defined in a default power scheme;
      monitor internal power requirements associated with on-board functions of the electronic device and determine that the internal power requirements satisfy predetermined criteria; and
      in response to determining: a) that the secondary electronic device requires an amount of power that exceeds the default power threshold; and b) that the internal power requirements satisfy the predetermined criteria, adjust a power scheme associated with the port and implemented by the power limiter to provide, to the secondary electronic device, an amount of power that exceeds the default power threshold.

2. The electronic device of claim 1, wherein determining that the secondary electronic device requires an amount of power that exceeds a default power threshold comprises determining that a current drawn by the secondary electronic device through the port is at a maximum allowable limit presently implemented by the power limiter.

3. The electronic device of claim 1, wherein determining that the secondary electronic device requires an amount of power that exceeds a default power threshold comprises:
   receiving power requirement data from the secondary electronic device, the power requirement data indicating the amount of power required by the secondary electronic device.

4. The electronic device of claim 3, wherein the port includes two power pins, two differential data pins for carrying differential data signals, and an identification (ID) pin, and wherein the power management controller is configured to receive the power requirement data over the ID pin.

5. The electronic device of claim 1, wherein determining that the secondary electronic device requires an amount of power that exceeds a default power threshold comprises:
   receiving device type information from the secondary electronic device;
   retrieving, based on the device type information, a power requirement profile from memory associated with the electronic device; and
   determining, from the retrieved power requirement profile, that the secondary electronic device requires an amount of power that exceeds the default power threshold.

6. The electronic device of claim 1, wherein adjusting a power scheme associated with the port comprises increasing a current limit for the port.

7. The electronic device of claim 1, wherein the secondary electronic device includes a battery, and wherein the power management controller is further configured to:
   receive, from the secondary electronic device, battery charge level information regarding the battery of the secondary electronic device; and
   determine, based on the battery charge level information, that the power scheme should be adjusted.

8. The electronic device of claim 7, wherein the port includes two power pins, two differential data pins for carrying differential data signals, and an identification (ID) pin, and wherein the power management controller is configured to receive the battery level information over the ID pin.

9. The electronic device of claim 7 wherein determining that the power scheme should be adjusted comprises:
   determining that the battery charge level represented by the battery charge level information is less than a battery charge threshold.

10. The electronic device of claim 1, wherein the power management controller is further configured to estimate an effect on the power source associated with use of the power scheme to provide power to the secondary electronic device connected via the port.

11. The electronic device of claim 10, further comprising an output interface and an input interface, and wherein the power management controller is configured to cause the output interface to output a warning indicating the effect on the power source associated with use of the power scheme to provide power to the secondary electronic device, and to receive input from the input interface indicating a power scheme preference, and wherein the adjustment of the power scheme of the port is in accordance with the power scheme preference.

12. The electronic device of claim 11, wherein the warning indicates an estimated operating time provided by the power source to operate the electronic device if the power scheme were used to provide power to the electronic device.

13. The electronic device of claim 1, wherein the power management controller is further configured to:
   receive input from an input interface of the electronic device, the input indicating a user-defined threshold associated with the power source;
   after adjusting the power scheme, monitoring power source conditions and determining that the power source has reached the user-defined threshold; and
   in response to determining that the power source has reached the user-defined threshold, adjusting the power scheme associated with the port and implemented by the power limiter to reduce the amount of power provided to the secondary electronic device.

14. The electronic device of claim 1, further comprising a communication controller configured to implement a universal serial bus (USB) On-The-Go specification and wherein determining that the secondary electronic device requires an amount of power that exceeds a default power threshold defined in a default power scheme comprises determining that the secondary electronic device requires a current that exceeds a predefined current associated with the On-The-Go specification and wherein adjusting the power scheme comprises increasing a current limit associated with the port to a limit that exceeds the limit associated with the On-The-Go specification.

15. The electronic device of claim 1, wherein the secondary electronic device includes a sensor for generating sensor data, and wherein the power management controller is further configured to:
   receive sensor information, based on the sensor data, from the secondary electronic device; and
   determine, based on the sensor status information, that the power scheme should be adjusted.

16. A method performed by a primary electronic device for managing power provided to a secondary electronic device over a port, the method comprising:
   determining that the secondary electronic device requires an amount of power that exceeds a default power threshold defined in a default power scheme;
   monitoring internal power requirements associated with on-board functions of the primary electronic device and determining that internal power requirements satisfy predetermined criteria; and
   in response to determining: a) that the secondary electronic device requires an amount of power that exceeds the default power threshold; and b) that the internal power requirements satisfy the predetermined criteria, adjusting a power scheme associated with the port and implemented by a power limiter of the primary electronic device to provide, to the secondary electronic device, an amount of power that exceeds the default power threshold.

17. The method of claim 16, wherein determining that the secondary electronic device requires an amount of power that exceeds the default power threshold comprises determining that a current drawn by the secondary electronic device through the port is at a maximum allowable limit presently implemented by the power limiter.

18. The method of claim 16, wherein determining that the secondary electronic device requires an amount of power that exceeds a default power threshold comprises:
- receiving power requirement data from the secondary electronic device, the power requirement data indicating the amount of power required by the secondary electronic device.

19. The method of claim 18, wherein the port includes two power pins, two differential data pins for carrying differential data signals, and an identification (ID) pin, and wherein the power management controller is configured to receive the power requirement data over the ID pin.

\* \* \* \* \*